US012803466B2

(12) United States Patent
Matsuda

(10) Patent No.: US 12,803,466 B2
(45) Date of Patent: Nov. 17, 2026

(54) POWER SUPPLY APPARATUS

(71) Applicant: DENSO CORPORATION, Kariya-city (JP)

(72) Inventor: Kunihiko Matsuda, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 198 days.

(21) Appl. No.: 18/584,810

(22) Filed: Feb. 22, 2024

(65) Prior Publication Data

US 2024/0195324 A1 Jun. 13, 2024

Related U.S. Application Data

(63) Continuation of application No. PCT/JP2022/031166, filed on Aug. 18, 2022.

(30) Foreign Application Priority Data

Aug. 25, 2021 (JP) ................................ 2021-137483

(51) Int. Cl.
*H02M 7/5387* (2007.01)
*H02H 7/122* (2006.01)

(52) U.S. Cl.
CPC ........ *H02M 7/53871* (2013.01); *H02H 7/122* (2013.01)

(58) Field of Classification Search
CPC ...... H02M 7/53871; H02M 1/32; H02M 7/48; H02H 7/122; H02J 7/00
USPC ...................................................... 363/56.02
See application file for complete search history.

(56) References Cited

U.S. PATENT DOCUMENTS

| | | | | |
|---|---|---|---|---|
| 11,431,179 B2 * | 8/2022 | Heo | ...................... | B60L 3/0046 |
| 2015/0251690 A1 | 9/2015 | Yamamoto | | |
| 2019/0291778 A1 * | 9/2019 | Nagashima | .......... | B62D 5/0481 |
| 2020/0321902 A1 * | 10/2020 | Kozawa | ............... | B62D 5/0481 |
| 2022/0356861 A1 | 11/2022 | Matsuda | | |

FOREIGN PATENT DOCUMENTS

| | | | | |
|---|---|---|---|---|
| JP | 2015039256 A * | 2/2015 | ............ | B60L 3/0061 |
| JP | 2018121453 A | 8/2018 | | |
| JP | 2021044971 A | 3/2021 | | |

* cited by examiner

*Primary Examiner* — Thienvu V Tran
*Assistant Examiner* — Lauren Ashley Shaw
(74) *Attorney, Agent, or Firm* — Precision Patents, P.C.

(57) ABSTRACT

A power supply apparatus includes a power converter, pull-up and pull-down resistors, a reverse-connection protective relay, a controller, and a dark current cut switch. The power converter includes upper-arm and lower-arm switching elements being connected in series between a power supply line and a ground line, and converts a DC power of a battery and supplies the converted DC power to a load. The pull-up resistor is connected between the power supply line and a common connection node between the upper-arm and lower-arm switching elements, and the pull-down resistor is connected between the common connection node and a ground. The reverse-connection protective relay cuts off a current from the power converter to the battery. The controller controls the power converter and the reverse-connection protective relay. The dark current cut switch cuts off a dark current flowing to the ground through the pull-up resistor and the pull-down resistor.

5 Claims, 4 Drawing Sheets

DURING OFF-OPERATION

DURING ON-OPERATION

POWER SUPPLY APPARATUS

CROSS REFERENCE TO RELATED APPLICATIONS

The present application is a continuation application of International Patent Application No. PCT/JP2022/031166 filed on Aug. 18, 2022, which designated the U.S. and claims the benefit of priority from Japanese Patent Application No. 2021-137483 filed on Aug. 25, 2021. The entire disclosures of all of the above applications are incorporated herein by reference.

TECHNICAL FIELD

The present disclosure relates to a power supply apparatus.

BACKGROUND

A power supply apparatus may convert a direct-current (DC) power of a battery through a power converter such as an inverter and supply the converted power to a load such as a three-phase motor. For example, the power supply apparatus may have a pull-up resistor and a pull-down resistor being connected to a connection node between an upper arm and a lower arm in each phase of the inverter, and may detect a motor relay fault based on a voltage at a voltage dividing node during an initial check.

SUMMARY

The present disclosure describes a power supply apparatus including a pull-up resistor, a pull-down resistor, a freewheeling diode, a controller, and a dark current cut switch.

BRIEF DESCRIPTION OF DRAWINGS

Objects, features and advantages of the present disclosure will become more apparent from the following detailed description made with reference to the accompanying drawings. In the drawings:

FIG. 4B is a diagram illustrating detection of abnormal fixation to the OFF state when the dark current cut switch is being turned on.

DETAILED DESCRIPTION

Figure 1:
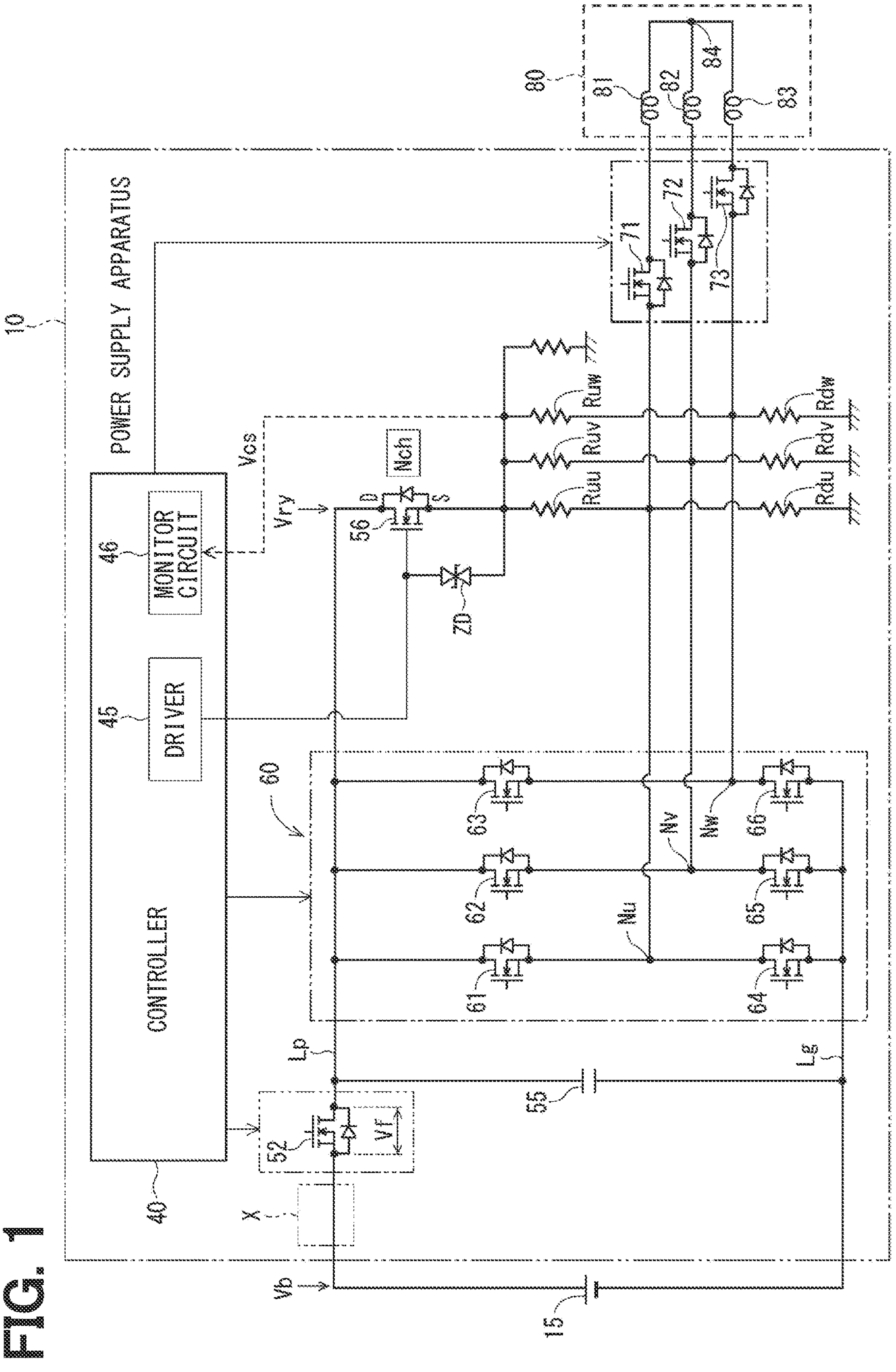
FIG. 1 is a circuit diagram of a power supply apparatus according to a first embodiment.

A power supply apparatus may be provided with a power-supply relay and a reverse-connection protective relay between a battery and an inverter. When the system stops operation, the power-supply relay and the reverse-connection protective relay may be turned off to prevent a battery voltage from being applied to the inverter.

However, there may be a demand for eliminating power-supply relays in order to reduce the number of components. When the power-supply relay is not provided, the battery voltage may be applied to an input unit of the inverter even during the stop of the system. Therefore, it is possible to stabilize a charging voltage. However, in the apparatus described above, a dark current may flow from the battery to a ground through a parasitic diode of the reverse-connection protective relay and further through a pull-up resistor and a pull-down resistor while the system stops operation.

According to an aspect of the present disclosure, a power supply apparatus includes a power converter, at least one pull-up resistor, at least one pull-down resistor, a reverse-connection protective relay, and a controller.

The power converter includes at least one set of an upper arm and a lower arm being connected in series between a power supply line connected to a battery and a ground line, and converts a DC power of the battery and supplies the converted power to a load. Each of the upper arm and the lower arm has a switching element.

The pull-up resistor is connected between the power supply line and an inter-arm connection node. The inter-arm connection node is a common connection node between the switching element in the upper arm and the switching element in the lower arm. The pull-down resistor is connected between the inter-arm connection node and the ground.

The reverse-connection protective relay is located in the midway of the power supply line and is parallel connected with a freewheeling diode that allows current flow from the battery side to the power converter side, and at the same time, cuts off the current flow from the power converter side to the battery side when it is turned off. The controller controls the power converter and the reverse-connection protective relay.

The power supply apparatus does not include a power supply relay that cuts off the current flow from the battery side to the power converter side through the power supply line between the battery and the reverse-connection protective relay in an off state of the power supply apparatus.

The power supply apparatus further includes a dark current cut switch. The dark current cut switch is provided between the reverse-connection protective relay and the pull-up resistor. The dark current cut switch is in the off state when the power supply apparatus stops driving, and cuts off a dark current flowing through the pull-up resistor and the pull-down resistor to the ground. For example, the dark current cut switch includes an N-channel field-effect transistor (FET) or a P-channel field-effect transistor (FET). Therefore, in the structure without the power-supply relay, it is possible to prevent the dark current from flowing while the system stops operation.

The following describes power supply apparatuses according to multiple embodiments with reference to the drawings. In the multiple embodiments, substantially the same components are denoted by the same reference numerals, and a description of the same components will be omitted. In the following description, first and second embodiments are collectively referred to as a present embodiment. The power supply apparatus according to the present embodiment converts a DC power of a battery and then supplies the converted power to a steering assistive motor as a load in an electric power steering apparatus. The steering assistive motor includes a three-phase brushless motor.

An ECU in the electric power steering apparatus functions as the power supply apparatus. The ECU includes, for example, a microcomputer, a pre-driver, and the like, and has a CPU (not shown), a ROM, a RAM, an I/O, and a bus line connecting these components. The ECU executes software processing by executing a program stored in advance by the CPU, and control by hardware processing by a dedicated electronic circuit.

The ECU of the electric power steering apparatus starts up (that is, starts driving) when the ignition signal of the vehicle is turned to an ON level, and stops driving when the ignition signal is turned to an OFF level. Hereinafter, the state in which the ECU is operating may also be referred to as "system in operation," and the state in which the ECU stops driving may also be referred to as "system stop." In the present embodiment, the structure for executing normal control of a motor during system operation is similar to the structure of a general motor control apparatus. The structure according to the present embodiment prevents a dark current from flowing through a circuit during the system stop.

The first embodiment and the second embodiment have the identical essential circuitry structure and the concept of cutting off a dark current, but the specific structures for cutting off the dark current are partially different. Although FIGS. 1 and 2 show a single-system circuitry structure, the present disclosure may also be applied to a dual-system circuitry structure.

First Embodiment

Figure 2:
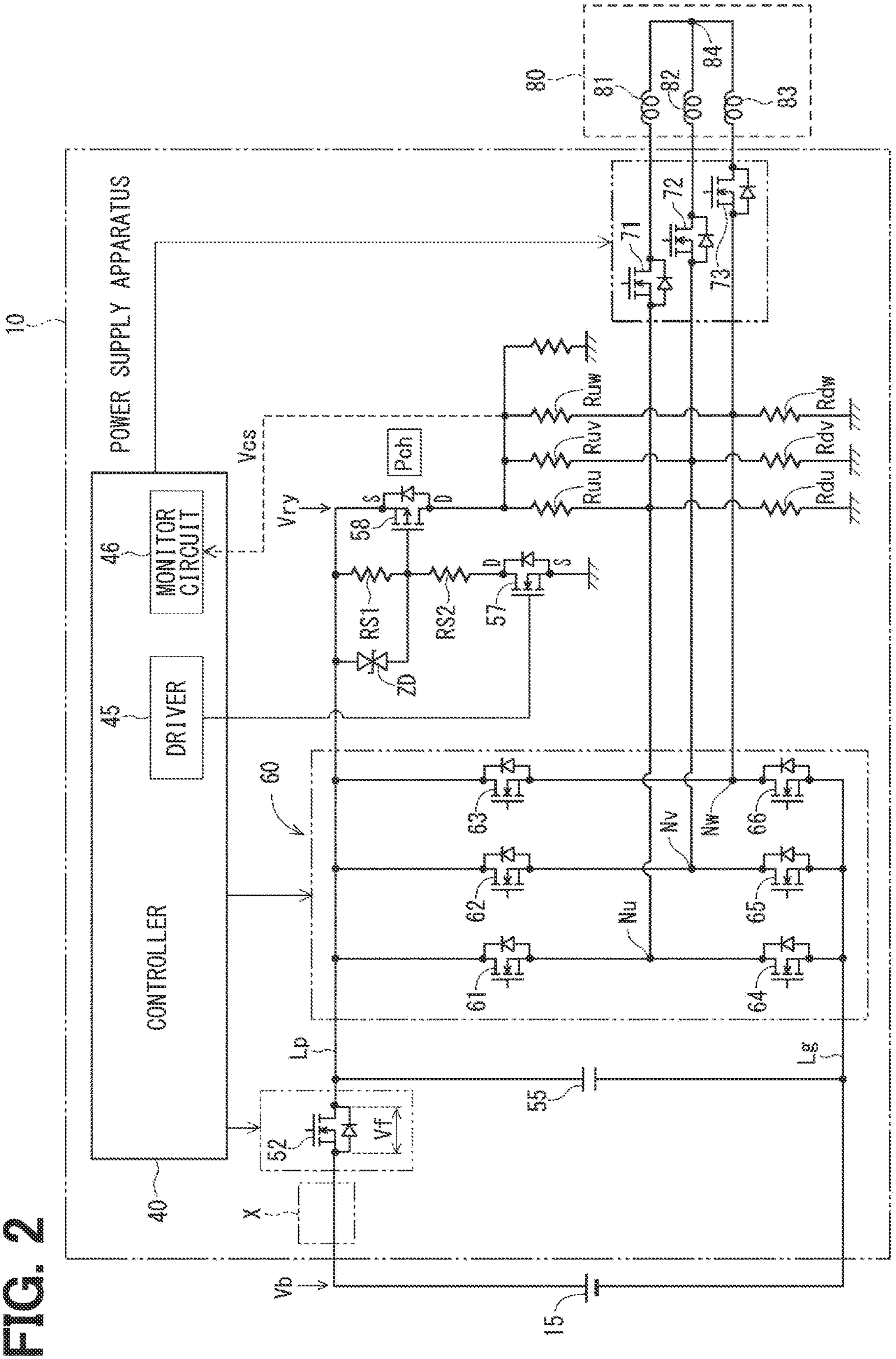
FIG. 2 is a circuit diagram of a power supply apparatus according to a second embodiment.

FIG. 1 illustrates a structure according to the first embodiment. A power supply apparatus 10 supplies three-phase alternating current (AC) power generated by an inverter 60 to three-phase windings 81, 82, 83 of a motor 80. The inverter 60 corresponds to a power converter. For example, when the motor 80 is in a Y-connection, the three-phase windings 81, 82, 83 are connected at a neutral node 84. However, the three-phase windings 81, 82, and 83 may also be in delta connection.

The power supply apparatus 10 includes, for example, an inverter 60, a smoothing capacitor 55, a reverse-connection protective relay 52, motor relays 71, 72, 73, pull-up resistors Ruu, Ruv, Ruw, and pull-down resistors Rdu, Rdv, Rdw. The power supply apparatus 10 includes a controller 40. As shown by arrows in FIG. 1, the controller 40 outputs ON/OFF signals to, for example, each of switching elements 61 to 66 of the inverter 60, the reverse-connection protective relay 52, the motor relays 71, 72, 73 to control operations.

The inverter 60 is connected to a positive electrode of the battery 15 through a power supply line Lp, and is connected to a negative electrode of the battery 15 through a ground line Lg. The inverter 60 includes three sets of upper and lower arm being connected in series between the power supply line Lp and the ground line Lg. Switching elements 61 to 66 are included in the three sets of upper and lower arm, respectively. The upper-arm switching elements 61, 62, and 63 for the U-phase, V-phase, and W-phase and the lower-arm switching elements 64, 65, and 66 for the U-phase, V-phase, and W-phase are connected in a bridge configuration. The inverter 60 converts a DC power of the battery 15 and then supplies the converted power to the three-phase windings 81, 82, 83 of the motor 80.

In the present embodiment, MOSFETs are used as the switching elements 61 to 66 of the inverter 60. Hereinafter, switches other than the MOSFET used as the dark current cut switch of the second embodiment are N-channel MOSFETs. In each of the switching elements 61 to 66, a freewheeling diode that allows a current from the low potential side to the high potential side is configured as a parasitic diode inside the switching element. Connection nodes between the upper-arm switching elements and the lower-arm switching elements of phases are defined as inter-arm connection nodes Nu, Nv, Nw, respectively. The smoothing capacitor 55 provided at the input unit of the inverter 60 smoothens the input voltage provided to the inverter 60.

A reverse-connection protective relay 52 is provided midway along the power supply line Lp from the battery 15 to the inverter 60. In the reverse-connection protective relay 52, freewheeling diodes for conducting a current from the battery 15 side to the inverter 60 side are connected in parallel. In the present embodiment, the parasitic diode of the MOSFET included in the reverse-connection protective relay 52 conducts a current from the battery 15 side to the inverter 60 side. The reverse-connection protective relay 52 cuts off a current from the inverter 60 side to the battery side when the reverse-connection protective relay 52 is in the OFF state.

In a comparative example, a power supply relay is provided at a power supply line between a battery and a reverse-connection protective relay. The power supply relay is connected so that the orientation of the parasitic diode is opposite to the orientation of the reverse-connection protective relay, and cuts off a current from the battery side to the inverter side when the power supply relay is in the OFF state.

In contrast, the power supply apparatus 10 according to the present embodiment does not include a power supply relay at a position indicated by a two-dot chain line at a position X as shown in FIG. 1. Accordingly, it is possible to reduce the number of parts of the power supply relay. Even during the system stop in which the power supply apparatus 10 stops driving, the battery voltage is applied to the smoothing capacitor 55 so that the charging voltage is stabilized. On the other hands, the drawback of not having the power supply relay will be described hereinafter.

The motor relays 71, 72, 73 are provided in a motor current path between the inter-arm connection nodes Nu, Nv, Nw of corresponding phases and the three-phase windings 81, 82, 83, respectively, to cut off the motor current path in the OFF state. In the present embodiment, the motor relays 71, 72, 73 are MOSFETs, and have parasitic diodes that allow current to flow from the inter-arm connection nodes Nu, Nv, Nw to the three-phase windings 81, 82, 83, respectively.

Pull-up resistors Ruu, Ruv, Ruw connect the power supply line Lp and inter-arm connection nodes Nu, Nv, Nw of corresponding phases. Pull-down resistors Rdu, Rdv, Rdw connect the inter-arm connection nodes Nu, Nv, Nw of corresponding phases and the ground. For example, as in an abnormality detector in the comparative example, each of the pull-down resistors Rdu, Rdv, Rdw has two voltage dividing resistors connected in series. Furthermore, an abnormality in the motor relays 71, 72, 73 or the three-phase windings 81, 82, 83 may be detected based on the voltage at a voltage dividing node as a connection node between two voltage dividing resistors.

The power supply line Lp is connected to the ground via pull-up resistors Ruu, Ruv, Ruw and pull-down resistors Rdu, Rdv, Rdw. The key point of the present embodiment is such a circuitry configuration, and the functions of the pull-up resistors Ruu, Ruv, and Ruw and the pull-down resistors Rdu, Rdv, and Rdw are not limited. For example, it does not matter what is detected based on the divided voltages of the pull-down resistors Rdu, Rdv, and Rdw.

The following describes the behavior during the system stop in the present embodiment, which does not include a power supply relay. When the power supply apparatus 10 stops driving, the switching element of the inverter 60, the reverse-connection protective relay 52, and the motor relays 71, 72, and 73 are all turned off, but the current path passing through the parasitic diode remains. Therefore, a dark current flows from the battery 15 to the ground through the parasitic diode of the reverse-connection protective relay 52, and further through the pull-up resistors Ruu, Ruv, Ruw and the pull-down resistors Rdu, Rdv, Rdw of the corresponding phases.

Even if the current value of the dark current is small, if the dark current continues to flow for a long time, it may consume unnecessary battery power and lead to depletion. The power supply apparatus 10 according to the present embodiment includes a dark current cut switch between the reverse-connection protective relay 52 and the pull-up resistors Ruu, Ruv, Ruw. The dark current cut switch is turned to the OFF state when the power supply apparatus 10 stops driving, and cuts off the dark current flowing to the ground through the pull-up resistors Ruu, Ruv, Ruw and the pull-down resistors Rdu, Rdv, Rdw. The controller 40 includes a driver 45 that executes ON/OFF-state operation of the dark current cut switch directly or indirectly.

The following describes the structure of a dark current cut switch 56 according to the first embodiment in detail. In the first embodiment, the dark current cut switch 56 includes an N-channel ("Nch" in FIG. 1) MOSFET. The drain of the dark current cut switch 56 is connected to the reverse-connection protective relay 52 on the inverter 60 side, and the source of the dark current cut switch 56 is connected to the pull-up resistors Ruu, Ruv, Ruw on a high-potential side.

The gate of the dark current cut switch 56 is connected to the driver 45 of the controller 40. A Zener diode ZD is connected in parallel with the dark current cut switch 56 between the source and gate of the dark current cut switch 56. The dark current cut switch 56 and Zener diode ZD may be provided inside an ASIC (ie, a customized IC). This reduces the board mounting area and the number of mounting steps.

During the system operation, the driver 45 normally outputs a Hi-level gate signal to the dark current cut switch 56 for turning the drain and source of the dark current cut switch 56 to the ON state. Therefore, the current flows from the power supply line Lp to the pull-up resistors Ruu, Ruv, and Ruw.

When the system is stopped and the power supply apparatus 10 stops driving, the gate signal from the driver 45 becomes Lo-level, and the dark current cut switch 56 is turned to the OFF state. Therefore, the current flowing to the ground via the pull-up resistors Ruu, Ruv, Ruw and the pull-down resistors Rdu, Rdv, Rdw is cut off. In the structure without the power supply relay, it is possible to prevent the dark current from flowing during the system stop.

In the first embodiment, since the dark current cut switch 56 is an N-channel MOSFET, it is possible to reduce the number of elements as compared to a situation where the dark current cut switch 56 is a P-channel MOSFET. When the battery voltage is relatively low (for example, 12 volts), the required gate voltage is relatively low, so there is no difficult in terms of the boosting ability of the booster circuit.

Second Embodiment

The following describes a second embodiment with reference to FIG. 2. The structure other than the dark current cut switch is the same as that in FIG. 1. In the second embodiment, a dark current cut switch 58 is a P-channel ("Pch" in FIG. 2) MOSFET. The source of the dark current cut switch 58 is connected to the reverse-connection protective relay 52 on the inverter 60 side, and the drain of the dark current cut switch 58 is connected to the high potential side of the pull-up resistors Ruu, Ruv, and Ruw.

The gate of the dark current cut switch 58 is grounded via a resistor RS2 and a driver switch 57 constructed by an N-channel MOSFET. A gate of the driver switch 57 is connected to the driver 45 of the controller 40. A Zener diode ZD and a resistor RS1 are connected in parallel between the source and gate of the dark current cut switch 58. The dark current cut switch 58, the driver switch 57, and each peripheral element may be provided inside the ASIC. This reduces the board mounting area and the number of mounting steps.

During the system operation, the driver 45 normally outputs a Hi level gate signal to the driver switch 57. When the driver switch 57 is turned the ON state, a current flows from the power supply line Lp through the resistors Rs1, Rs2 and the driver switch 57, and the gate voltage of the dark current cut switch 58 decreases. Therefore, the gate of the dark current cut switch 58 becomes a Lo-level, and the source-drain connection is turned to the ON state. Therefore, the current flows from the power supply line Lp to the pull-up resistors Ruu, Ruv, and Ruw.

When the system stops and the power supply apparatus 10 stops driving, the gate signal from the driver 45 becomes the Lo-level and the driver switch 57 is turned to the OFF state. Therefore, the gate of the dark current cut switch 58 becomes Hi-level, and the source-drain connection is turned to the OFF state. Therefore, the current flowing to the ground via the pull-up resistors Ruu, Ruv, Ruw and the pull-down resistors Rdu, Rdv, Rdw is cut off. In the structure without the power supply relay, it is possible to prevent the dark current from flowing during the system stop.

In the second embodiment, two dark current cut switches 58 and two driver switches 57 are required. When the battery voltage is relatively high (for example, 48 volts), if the dark current cut switch is provided with an N-channel MOSFET, a high gate voltage is required, and the booster circuit is required to have an excessive boosting ability. On the other hand, when the dark current cut switch is provided with a P-channel MOSFET, the boosted voltage by the booster circuit can be lowered.

Initial Check of Dark Current Cut Switch

The following describes an initial check executed at the start-up of the power supply apparatus 10 and detecting an abnormality in which the dark current cut switch is fixed to the ON state or OFF state. This initial check can be commonly applied to the dark current cut switches 56 and 58 of the N-channel MOSFET and P-channel MOSFET according to the first and second embodiments. In the following description, the reference numerals 56, 58 for the dark current cut switches will be omitted.

As shown in FIGS. 1, 2, the controller 40 includes a monitor circuit 46 that detects an abnormality in the dark current cut switch. The monitor circuit 46 acquires a post-voltage of the dark current cut switch as a voltage of the dark current cut switch on the pull-up resistors Ruu, Ruv, Ruw side. A voltage of the power supply line Lp between the reverse-connection protective relay 52 and the dark current cut switch is defined as a post-voltage Vry of the reverse-connection protective relay. While the system is stopped, the reverse-connection protective relay 52 is in the OFF state, and the voltage obtained by subtracting the voltage drop Vf of the parasitic diode of the reverse connection protective relay 52 from the battery voltage Vb becomes the post-voltage of the reverse-connection protective relay Vry (Vry=Vb−Vf). The post-voltage Vry corresponds to a voltage at a connection node between the dark current switch and each of the pull-up resistors Ruu, Ruv, Ruw.

Figure 3:
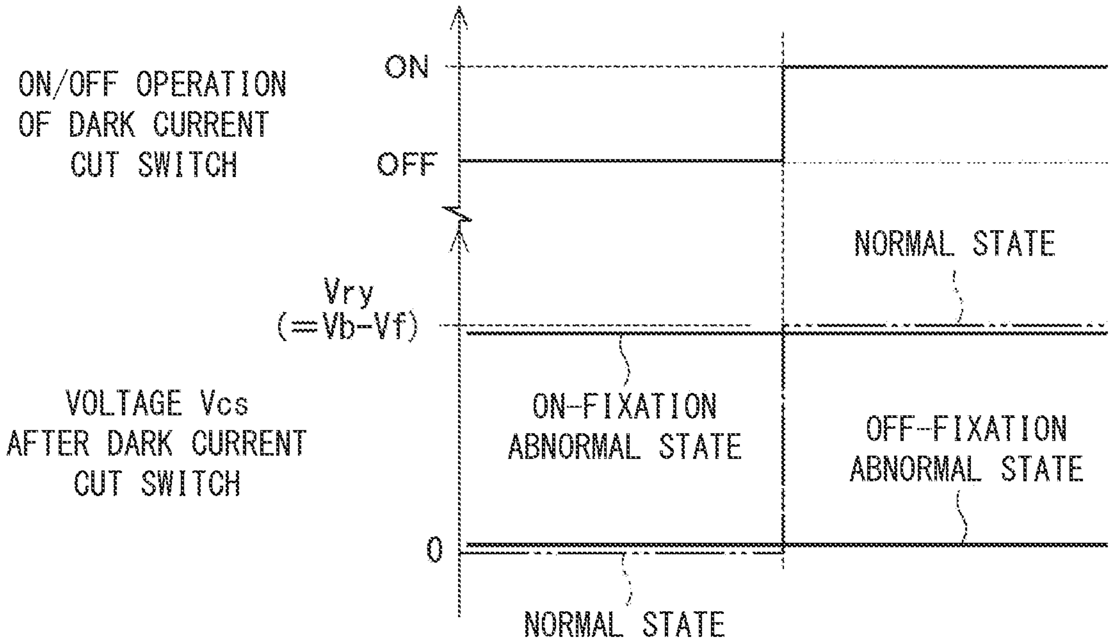
FIG. 3 is a diagram illustrating a post-voltage of a dark current cut switch when the dark current cut switch is abnormally fixed to an ON state and when the dark current cut switch is abnormally fixed to an OFF state.

As shown in FIG. 3, when the dark current cut switch is normal, the voltage Vcs becomes zero volt when the dark current cut switch is in the OFF state, and becomes equal to the voltage Vry in the ON state. When the dark current cut switch is abnormally fixed to the ON state, the voltage Vcs becomes a value closer to the voltage Vry during the OFF-state operation. When the dark current cut switch is abnormally fixed to the OFF state, the voltage Vcs becomes a value closer to zero volt during the ON-state operation.

Figure 4A:
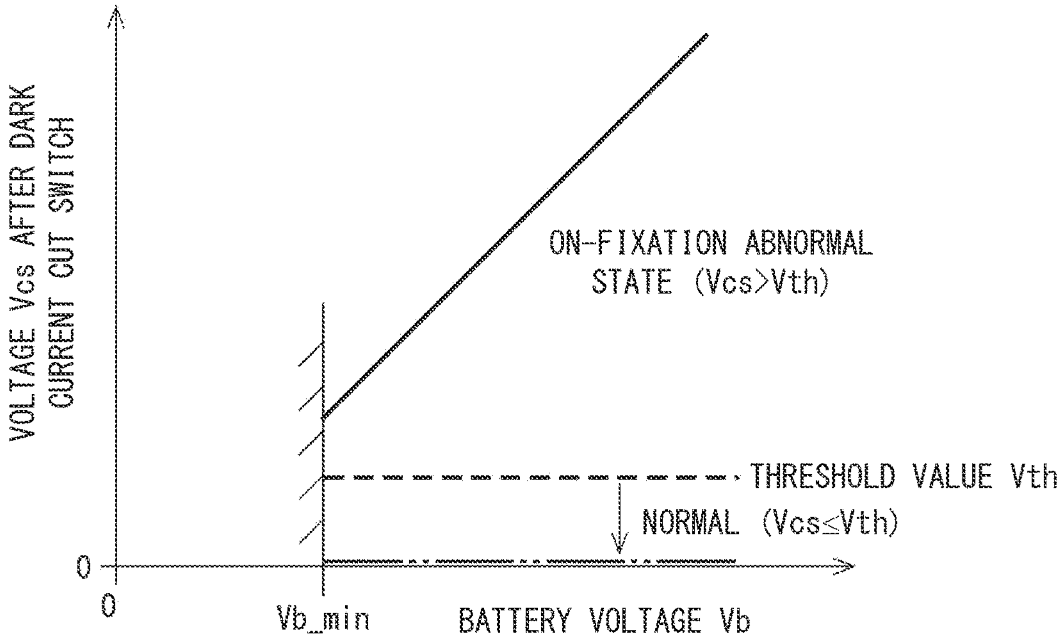
FIG. 4A is a diagram illustrating detection of abnormal fixation to the ON state when a dark current cut switch is being turned off.
Figure 4B:
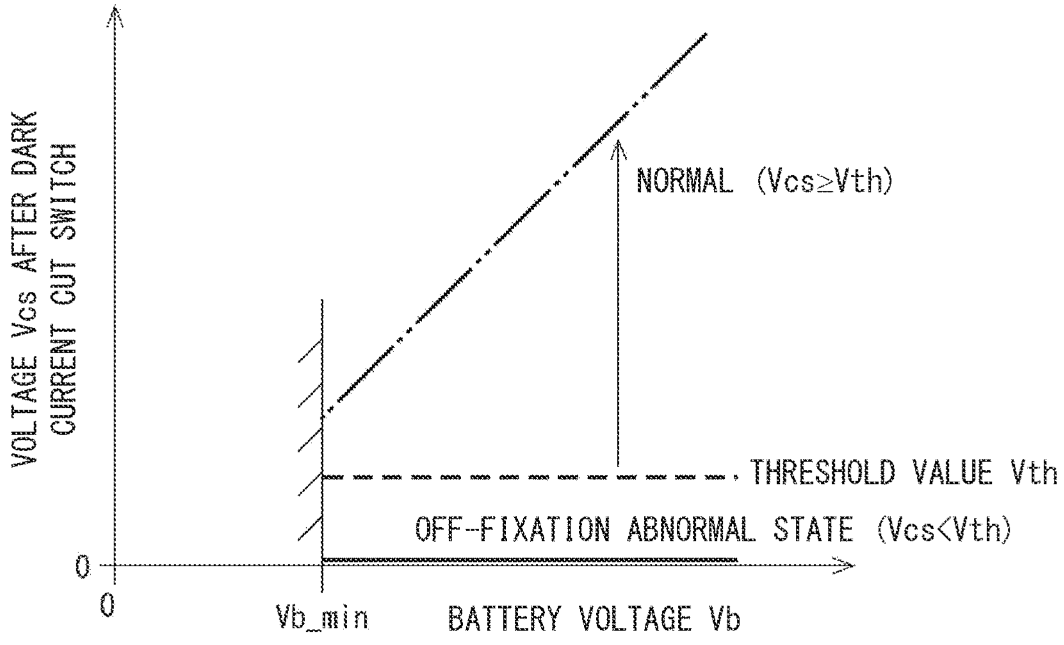

FIGS. 4A, 4B illustrate an abnormality detection logic in consideration of fluctuation in the battery voltage Vb. On the premise that the battery voltage Vb is greater than or equal to the minimum value Vb_min, the threshold value Vth is set as shown in the equation below. The margin is determined in consideration of detection errors and variations.

Equation: Vth=Vb_min−Vf−margin

As shown in FIG. 4A, when the dark current cut switch is normal during the OFF-state operation, the voltage Vcs is zero volt regardless of the battery voltage Vb, and is equal to or lower than the threshold value Vth. When the dark current cut switch is abnormally fixed to the ON state, the voltage Vcs has a positive correlation with the battery voltage Vb and becomes larger than the threshold value Vth.

As shown in FIG. 4B, when the dark current cut switch is normal at the time of ON-state operation, the voltage Vcs has a positive correlation with the battery voltage Vb and is equal to or higher than the threshold value Vth. When the dark current cut switch is abnormally fixed to the OFF state, the voltage Vcs is zero volt regardless of the battery voltage Vb, and becomes smaller than the threshold value Vth.

The monitor circuit 46 compares the voltage Vcs with the threshold value Vth in the OFF-state operation and the ON-state operation of the dark current cut switch, and detects that the dark current cut switch is abnormally fixed to the ON state and the OFF state. The threshold value Vth during the OFF-state operation and the ON-state operation may not only be set to values, but also different values. In a case where an abnormality of the dark current cut switch is detected in the initial check, the controller 40 executes abnormality measures such as issuing an alarm. The abnormality measure may be switched depending on the abnormality mode.

Other Embodiments

The load of the power supply apparatus 10 is not only limited to a three-phase motor 80, but may also be a single-phase motor or a multi-phase motor other than the three-phase motor. Additionally, the load may also be an actuator other than a motor or another load. The number of switching elements on the upper and lower arms of the inverter is not limited to three sets, but may be one set or more. For example, an H-bridge circuit may be used instead of a multi-phase inverter as a power converter.

A field-effect transistor (FET) other than MOSFET may be used as a semiconductor switching element included in the dark current cut switch. For example, the dark current cut switch 56 according to the first embodiment is constructed by an N-channel FET, and the dark current cut switch 58 according to the second embodiment is constructed by a P-channel FET. Additionally, the dark current cut switch is not limited to the FET, but may also be constructed by, for example, other types of semiconductor switching elements or mechanical relays.

As described in the above embodiment, one or more of the dark current cut switch and its peripheral elements such as the Zener diode and the resistor may be provided inside an application specific integrated circuit (ASIC).

The present disclosure should not be limited to the embodiment described above. Various other embodiments may be implemented without departing from the scope of the present disclosure.

The control circuit and method described in the present disclosure may be implemented by a special purpose computer which is configured with a memory and a processor programmed to execute one or more particular functions embodied in computer programs of the memory. Alternatively, the control circuit and the method described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer program may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A power supply apparatus comprising:

a power converter including a set of an upper-arm switching element and a lower-arm switching element being connected in series between a power supply line and a ground line, the power supply line being connected to a battery, the power converter configured to convert Direct Current (DC) power of the battery into Alternating Current (AC) power and then supply the AC power to a load;

a pull-up resistor connected between an inter-arm connection node and the power supply line, the inter-arm connection node being a connection node between the upper-arm switching element and the lower-arm switching element;

a pull-down resistor connected between the inter-arm connection node and a ground;

a reverse-connection protective relay being located midway along the power supply line from the battery to the power converter, the reverse-connection protective relay being connected in parallel with a freewheeling diode, the freewheeling diode configured to conduct a current from the battery to the power converter, the reverse-connection protective relay configured to cut off a current from the power converter to the battery in an off state of the reverse-connection protective relay;

a controller configured to control the power converter and the reverse-connection protective relay; and a dark current cut switch located between the power converter and the pull-up resistor, the dark current cut switch configured to be turned off to cut off a dark current flowing to the ground through the pull-up resistor and the pull-down resistor in a case where the power supply apparatus stops driving, wherein the power supply apparatus is free of any power supply relay between the battery and the reverse-connection protective relay.

2. The power supply apparatus according to claim 1, wherein the dark current cut switch includes an N-channel field-effect transistor.

3. The power supply apparatus according to claim 1, wherein the dark current cut switch includes a P-channel field-effect transistor.

4. The power supply apparatus according to claim 1, wherein the controller is further configured to execute an initial check for the power supply apparatus, in which the controller checks whether the dark current cut switch is abnormally fixed to an on state or an off state based on a voltage of a connection node between the dark current cut switch and the pull-up resistor.

5. The power supply apparatus according to claim 1, wherein the battery is directly connected to the reverse-connection protective relay through the power supply line.

* * * * *